(No Model.)
C. PROUTY.
CROSSCUT SAW.
No. 440,253. Patented Nov. 11, 1890.
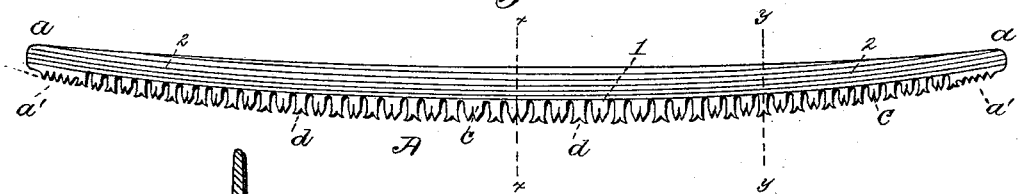
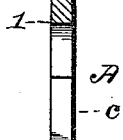
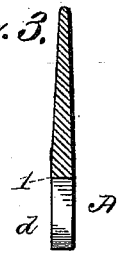
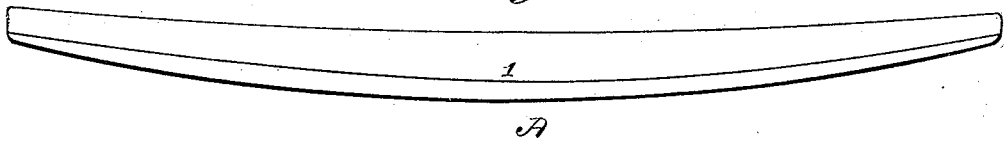
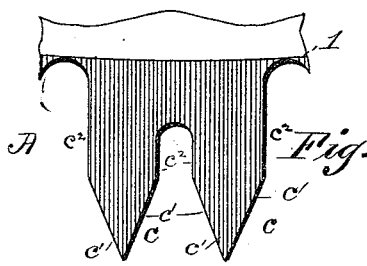
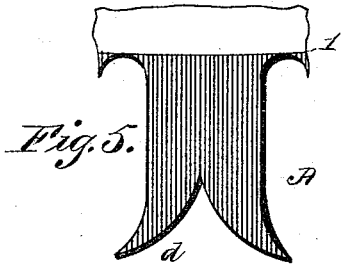
Witnesses
M. B. Harris
K. B. Brereton
Inventor
Chester Prouty
By Wm. H. Brereton
his Attorney.

UNITED STATES PATENT OFFICE.

CHESTER PROUTY, OF INSTANTER, PENNSYLVANIA.

CROSSCUT-SAW.

SPECIFICATION forming part of Letters Patent No. 440,253, dated November 11, 1890.

Application filed May 13, 1890. Serial No. 351,599. (No model.)

*To all whom it may concern:*

Be it known that I, CHESTER PROUTY, a citizen of the United States, residing at Instanter, in the county of Elk and State of Pennsylvania, have invented certain new and useful Improvements in Crosscut-Saws; and I do hereby declare the following to be a full, clear, and exact description of the invention, such as will enable others skilled in the art to which it appertains to make and use the same.

My invention relates to improvements in crosscut-saws; and my said invention consists, first, of a crosscut-saw blade curved upon its front edge and concave at its back, said curves of the front and back edges of the saw extending from end to end thereof, and the curve of the front edge of less diameter than that of the back, whereby the blade is of greater width at its central portion than at the ends, and made beveling or reduced in thickness upon each side, which bevel or reduction in thickness extends in curved lines from end to end of the blade, commencing at the base of the teeth and increasing in depth toward the back edge of the blade and decreasing in depth toward the ends, as and for the purposes as will hereinafter more fully appear, and, second, in providing such a saw-blade, formed as just above stated, with a series of double-pointed cutting-teeth, alternating with a series of raking-teeth and a series of small triangular teeth and narrow blank portion at each end, as and for the purposes as will be hereinafter more fully described, and form the subject-matter of the annexed claims.

Figure 1 is a view in elevation of a crosscut-saw constructed according to my invention. Figs. 2 and 3 are transverse sections on the line $x\ x$ and $y\ y$, respectively, of Fig. 1. Fig. 4 is a detail view, on an enlarged scale, of one of the cutting-teeth; and Fig. 5 is a similar view of one of the raking-teeth. Fig. 6 represents the blank from which the saw is made, and Fig. 7 a view of the top edge of the saw-blade.

In carrying out my invention I proceed as follows: Along the curved edge of the blank A, formed from a plate of good rolled steel of proper thickness and temper, the teeth are first cut. Then the plate is ground through from end to end, leaving it at all points the same gage. Then, commencing at the base of the teeth at the center of the saw, the blade is ground so as to reduce the thickness of the same along the back edge, as shown in Figs. 2, 3, and 7, and this grinding of the blade is in regular curved lines running parallel to each other longitudinally of the blade, and extends from end to end thereof, as shown in Fig. 1, and, as shown in Figs. 2 and 7, such grinding of the blade decreases proportionally toward the ends and increases toward the back of the blade, so that the central portion of the blade along its back is the thinnest. This taper given to the saw-blade only extends to a point $l$ at the base of the teeth. All the said teeth from end to end of the blade are therefore of equal thickness from crotch to point.

A portion, as at $a$, is left at each end of the blade to receive the handle, and this portion $a$ is of less width than the adjoining portion of the blade, so that the end teeth project below the edge thereof, as at $a'$, Fig. 1. The back edge of the blade, as also the corners at the ends of the same, is rounded, so as to prevent injury to the operator.

The blades may be of various lengths and thicknesses and the curve of the line at the points of the teeth, as well as the back, may vary—that is, more or less bulge may be made at the belly, according to the particular use the saw is intended for. The distance apart of the teeth is also to be regulated according to the nature of the wood to be cut, the teeth to be wide apart for soft wood and close together for hard wood, and these teeth of the saw are formed as follows: At each end of the blade are five small teeth of the usual triangular form, as shown at $a'$, Fig. 1. The other teeth consist of cutting-teeth alternating with cleaning-teeth of peculiar form, as will be hereinafter more particularly described, $c$ being the cutting-teeth, and $d$ the raking or cleaning teeth, and each of these teeth has double points, as shown in Figs. 4 and 5. The crotch of the raking or cleaning teeth $d$ is of triangular form, while the points of the cutting-teeth are separated by a circle crotch.

To form the raking-teeth $d$, Fig. 5, they are temper-drawn, so that they can be swaged up without breaking their points. A swage of the desired shape is now used and the said teeth brought to the proper shape. Then the swage is placed on the top of the tooth and a blow given to it with a hammer, whereby the points of the teeth will be spread apart and bent to the shape of the swage, as in Fig. 5. The object of such construction of cleaning-tooth is to lift the sawdust from the bottom of the kerf and discharge it at each stroke. The kerf is thus kept clean and the continued or repeated cutting of the sawdust prevented, so that less labor and time are required in sawing than is usually the case with ordinary saws. In addition to these advantages, due to the form of cleaning-tooth, the temper thereof being drawn, much time is saved in filing and said files are not so quickly worn out.

The cutting-teeth, Fig. 4, are formed as follows: Commencing at the point, the same is beveled about one-sixteenth of an inch upon both sides, as at $c'$ $c'$. Then from the shoulder $c^2$ to the circle crotch of the tooth it is filed nearly square or straight across. After being filed these teeth are set to suit different kinds of timber. It has been found that as the result of such construction of cutting-teeth less filing is required to keep them sharp, and the cutting is uniform and regular from end to end of the saw. The sawdust also does not pack against the sides of the tooth, but is carried out by the rakers assisted by the square shoulders of the cutting-teeth; and while all surplus and unnecessary metal is removed from the saw-blade when formed as herein shown and described, yet ample metal is left at the points necessary to be strengthened to form a strong and durable yet light and easily-handled saw that requires little time to sharpen or set. The bevel and curve given to the back of the saw prevent its becoming easily clamped in the wood, and the straight sides given to the teeth hold the saw in its proper position to cut straight and true.

While the bevel given to the back edge of the saw will prevent its easily becoming fast in the wood, the width of metal left along the base of the teeth will be sufficient to give the necessary strength to the saw and prevent its being readily bent or twisted when in use.

Again referring to Fig. 6, it will be noted that the line 1 1, indicating the lower edge of the grind or bevel given to the back of the blade, is farther from the points of the teeth at the center than at the ends of the blade, and, as before stated, the grinding of the blade commences at the center and runs toward each end in regular parallel lines, as shown at 2 2, Fig. 1, and such grinding, as shown in Fig. 7, decreases in depth toward the ends, so that the blade is transversely thinner at the center along its back than at the back of the ends. The space for the teeth, however, is of even or uniform transverse thickness from end to end, but of greater vertical width at the central portion of the blade than at the ends thereof.

The teeth of the saw being longer along the center than at the ends, and as the beveling of the back commences at the base of the teeth, the space not beveled is therefore greater at the central portion of the blade, and thence gradually tapers toward each end, where it nearly runs out or meets the outer curved line of the blade, as seen in dotted lines on Fig. 1.

Having thus described my invention, I claim as new and desire to secure by Letters Patent of the United States the following, viz:

1. A crosscut-saw blade curved upon its front edge and concave at its back, said curves of the front and back edges of the saw extending from end to end thereof, and the curve of the front edge of less diameter than that of the back, whereby the blade is of greater width at its central portion than at the ends and made beveling or reduced in thickness upon each side, which bevel or reduction in thickness extends in curved lines from end to end of the blade, commencing at the base of the teeth and increasing in depth toward the back edge of the blade and decreasing in depth toward the ends, as and for the purposes described.

2. A crosscut-saw blade curved upon its front edge and concave at its back, said curves of the front and back edges of the saw extending from end to end thereof, and the curve of the front edge of less diameter than that of the back, whereby the blade is of greater width at its central portion than at the ends and made beveling or reduced in thickness upon each side, which bevel or reduction in thickness extends in curved lines from end to end of the blade, commencing at the base of the teeth and increasing in depth toward the back edge of the blade and decreasing in depth toward the ends and having a series of double-pointed cutting-teeth $c$, alternating with a series of raking-teeth $d$, series of small triangular teeth $a'$, and narrow blank portion $a$ at each end, as shown and described, for the purposes specified.

In testimony whereof I affix my signature in presence of two witnesses.

CHESTER PROUTY.

Witnesses:
  J. L. BROWN,
  W. D. DRYSDALE.